July 8, 1930. W. B. JENKINS 1,769,998
DREDGE BUCKET TOOTH
Filed Aug. 14, 1928
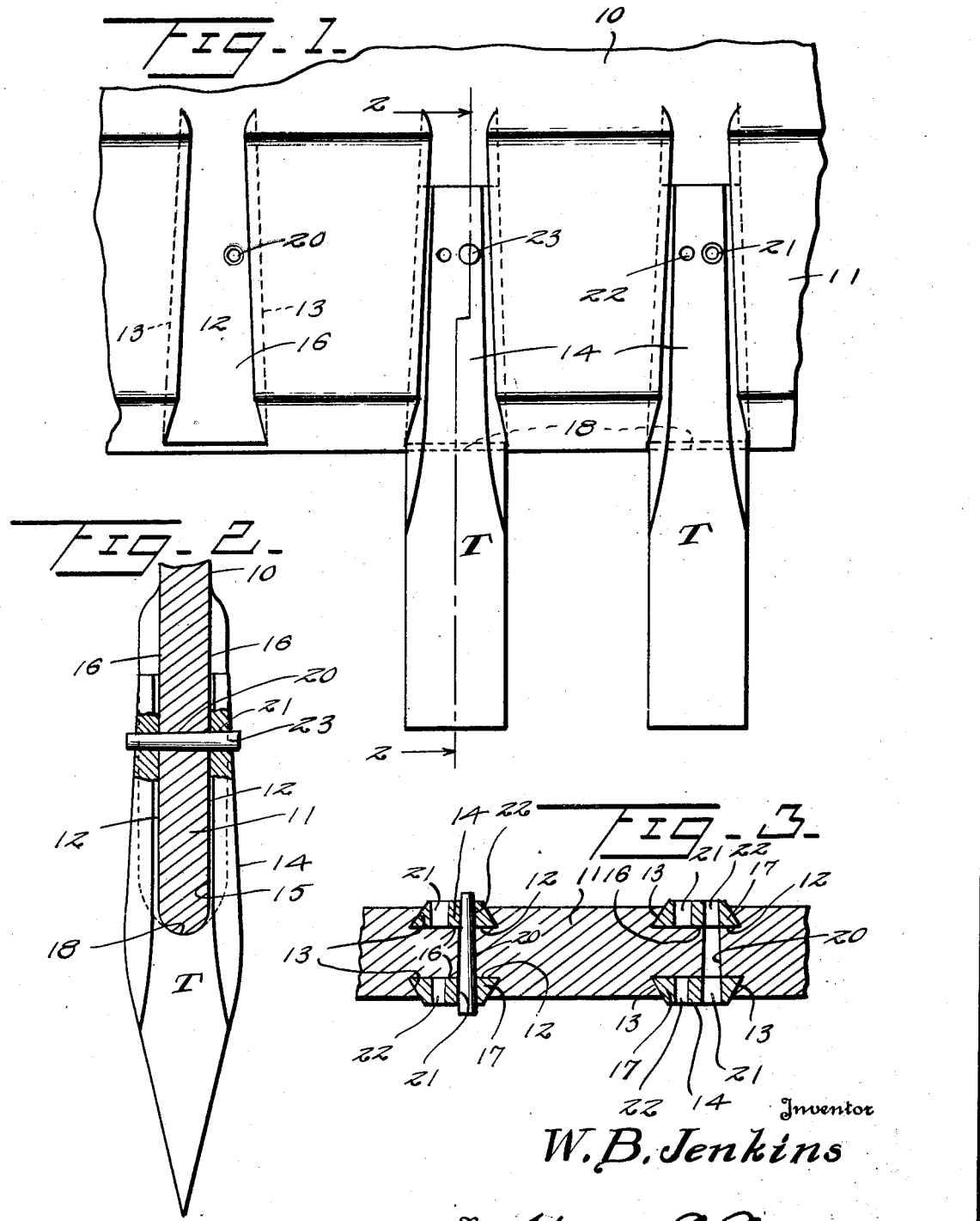

Patented July 8, 1930

1,769,998

UNITED STATES PATENT OFFICE

WALTER B. JENKINS, OF OAKLAND CITY, INDIANA

DREDGE-BUCKET TOOTH

Application filed August 14, 1928. Serial No. 299,616.

This invention relates to dredge bucket teeth and a mounting therefor.

An important object of the invention is to provide a method of attaching teeth to the dredge buckets, enabling the teeth to be very readily removed and replaced when they are worn to the extent when they become useless.

A further object of the invention is to provide a construction such that the tooth may be readily reversed, so that when it becomes worn on one side, the opposite side of the tooth may be brought into use.

A still further object of the invention is to provide in a construction of this character an arrangement such that the use of rivets or similar securing elements may be eliminated and a mounting maintaining the tooth rigid with relation to the bucket provided.

These and other objects I attain by the construction shown in the accompanying drawings, wherein for the purpose of illustration is shown a preferred embodiment of my invention and wherein:—

Figure 1 is a fragmentary elevation of a dredge bucket lip and tooth construction in accordance with my invention;

Figure 2 is a section on the line 2—2 of Figure 1;

Figure 3 is a transverse sectional view therethrough.

Referring now more particularly to the drawings, the numeral 10 generally designates the tooth bearing wall of a dredge bucket which, in accordance with my invention, is provided with a thickened lip 11. In opposite faces of this thickened lip, I form grooves 12 tapering in width toward the inner end of the thickened portion, said grooves having their side walls 13 undercut, preferably making the groove in dovetail form. The tooth T is provided with a shank 14, which is shotted, as at 15, with a slot having a width equal to the thickness of the lip between the bases 16 of aligned grooves arranged at opposite faces thereof. The legs 17 produced by this slot are tapered to correspond to the taper of the grooves 12 and have their side walls shaped to fit against the undercut side walls 13 of the grooves. The inner end 18 of the slot 15 is shaped to conform to the shaping of the outer end of the lip and to seat thereagainst.

It will be obvious that by properly sizing the leg 17 and the grooves, the inner end wall of the slot 15 will engage this outer face at the same time that the side faces 17 of the legs come into firm engagement with the walls 13 of the tapered slots 12, at which time the tooth T will be firmly held against transverse movement and against inward movement with relation to the lip.

While such teeth have a tendency to retain their seats without the assistance of external securing elements, I preferably form through the lip between the bases 16 of each aligned pair of grooves a tapered opening 20 which is disposed slightly to one side of the center of the groove. Each leg is provided with correspondingly tapered openings 21 and 22, there being a large and a small opening through each leg. The large opening of one of the legs will align with the larger end of the opening 20 without regard to the position of the tooth. A tapered pin 23 is inserted to insure the integrity of the connection.

Since the grooves 12 open through the inner end of the enlargement of the lip, there is no danger of the collection of dirt therein in such manner that it would render access to the end of the legs 14 impossible or the insertion of these legs difficult and accordingly the removal of a tooth constitutes simply in removing the tapered pin 23 and jarring the end of the tooth until it is released from the walls of the groove. This will be accomplished by a very small movement of the tooth so that the entire operation will occupy a very short time, enabling the teeth of the bucket to be changed with a saving of one to one and one-half hours in time, as compared to the changing of teeth with the present mounting construction. Those portions of the front edge of the lip 11 that are located between the side walls of the grooves 12, are free from recesses, notches or the like, and the inner ends 18 of the slots 15 are free from webs or the like and have full abutting contact with said portions of the lip. Due thereto, the lip 11 and the teeth T are comparatively cheap and easy to manufacture, and the lip is not weakened in adapting it for the application thereto of the teeth. The grooves 12 are similar, and the short shanks 14 of the teeth T are similar whereby to permit the teeth to be reversed. The openings 21 and 22 in the shanks 14 are so arranged that one pair of the same will register with each of the openings 20 of the lip 11 in any application of the teeth T. As the beveled side edges of the shank 14 contact with the under cut side walls 13 of the slots 12, and as the front ends of said walls are located in close proximity to the front edge of the lip 11, the teeth T are held against any tilting movement with respect to the lip, with the result that the upward and downward strain on the teeth during the use of the bucket will not break or bend the shanks or place any strain on the pins 23.

Since the construction hereinbefore set forth is capable of a certain range of change and modification without materially departing from the spirit of the invention, I do not limit myself to such specific structure except as hereinafter claimed.

I claim:—

1. A dredge bucket having a thickened lip provided in its upper and lower faces with inwardly tapering grooves, the grooves being similar and extending inwardly from points close to the front edge of the lip and having under cut side walls, teeth having similar short upper and lower shanks similar in formation to the grooves and snugly fitting in the same, the lip being provided with openings extending transversely therethrough and communicating with the grooves, the shanks of each tooth being provided with pairs of openings and the openings of each pair tapering in opposite directions, one pair of the openings of each tooth alining with one of the openings in the lip, and tapered pins passing through the alined openings.

2. A dredge bucket having a thickened lip provided in its upper and lower faces with inwardly tapering grooves, the grooves extending inwardly from points close to the front edge of the lip and provided with under cut side walls, those portions of said edge of the lip located between the side walls of the grooves being smooth or unbroken, teeth having similar short upper and lower shanks similar to the grooves and snugly fitting in the same, the inner ends of the slots between the shanks being smooth and arranged in full abutting contact with said portions of the front edge of the lip, the shanks of each tooth being provided with pairs of openings and the openings of each pair tapering in opposite directions, one pair of the openings of each tooth aligning with one of the openings in the lip, and tapered pins passing through the alined openings.

3. A dredge bucket having a thickened lip provided in its upper and lower faces with grooves tapering inwardly in width, the grooves being similar and extending inwardly from points close to the front edge of the lip and having under cut side walls and fully opened at their inner ends, reversible teeth having similar upper and lower shanks fitting in the grooves, the shanks tapering inwardly in width and having beveled side edges snugly contacting with the under cut side walls of the grooves, and elements passing transversely through the lip and arms to hold the teeth against outward displacement from the lip, the contact between the side edges of the arms and the side walls of the grooves holding the arms against movement away from the lip.

In testimony whereof I hereunto affix my signature.

WALTER B. JENKINS.